United States Patent
Eagles (10) Patent No.: US 10,668,947 B2
(45) Date of Patent: Jun. 2, 2020

(54) ELECTRO-HYDRAULIC STEERING CONTROL SYSTEM

(71) Applicant: Deere & Company, Moline, IL (US)

(72) Inventor: Derek M. Eagles, Cedar Falls, IA (US)

(73) Assignee: DEERE & COMPANY, Moline, IL (US)

( * ) Notice: Subject to any disclaimer, the term of this patent is extended or adjusted under 35 U.S.C. 154(b) by 120 days.

(21) Appl. No.: 15/477,705

(22) Filed: Apr. 3, 2017

(65) Prior Publication Data

US 2018/0281852 A1    Oct. 4, 2018

(51) Int. Cl.
| | |
|---|---|
| *B62D 5/06* | (2006.01) |
| *B62D 5/09* | (2006.01) |
| *B62D 5/30* | (2006.01) |
| *B62D 5/093* | (2006.01) |
| *B62D 6/00* | (2006.01) |
| *B62D 1/22* | (2006.01) |

(52) U.S. Cl.
CPC ............... *B62D 5/06* (2013.01); *B62D 1/22* (2013.01); *B62D 5/09* (2013.01); *B62D 5/093* (2013.01); *B62D 5/30* (2013.01); *B62D 6/007* (2013.01)

(58) Field of Classification Search
CPC . B62D 5/06; B62D 5/09; B62D 5/093; B62D 5/097
See application file for complete search history.

(56) References Cited

U.S. PATENT DOCUMENTS

| | | | | |
|---|---|---|---|---|
| 4,028,997 A * | 6/1977 | Lang | ............... | B62D 5/093 180/432 |
| 4,052,929 A * | 10/1977 | Baatrup | ............... | B62D 5/08 91/29 |
| 4,356,759 A * | 11/1982 | Ljubimov | ............... | B62D 5/09 180/403 |
| 4,364,302 A * | 12/1982 | Thomsen | ............... | B62D 5/09 137/111 |
| 5,489,005 A * | 2/1996 | Marcott | ............... | B62D 12/00 180/405 |
| 5,520,262 A * | 5/1996 | Marcott | ............... | B62D 5/06 180/418 |
| 6,279,675 B1 * | 8/2001 | Bohner | ............... | B62D 5/003 180/403 |
| 6,502,661 B1 * | 1/2003 | Heitzer | ............... | B62D 3/14 180/403 |

(Continued)

*Primary Examiner* — Kevin Hurley
(74) *Attorney, Agent, or Firm* — Taft Stettinius & Hollister LLP; Stephen F. Rost (57) ABSTRACT

A steering system for a work vehicle having a steerable wheel. The steering system includes a steering input device configured to provide a first steering input and a second steering input to move the steerable wheel. A pilot system is operatively connected to the steering input device and includes a first pilot line operatively connected to the first steering input and a second pilot line operatively connected to the second steering input. A piloted system is operatively connected to the pilot system and includes a direction control valve operatively connected to each of the first and second pilot lines and to a steering cylinder. The steering cylinder is coupled to the steerable wheel. The direction control valve responds to each of the pressure signals of the first and second pilot lines to adjust the position of the steering cylinder which in turn moves the steerable wheel.

19 Claims, 4 Drawing Sheets

(56) References Cited

U.S. PATENT DOCUMENTS

| | | | |
|---|---|---|---|
| 7,837,001 B2 * | 11/2010 | Young | B62D 5/093 |
| | | | 180/441 |
| 7,913,800 B2 * | 3/2011 | Graeve | B62D 5/093 |
| | | | 180/421 |
| 8,428,823 B2 * | 4/2013 | Saito | E02F 9/225 |
| | | | 701/41 |
| 8,448,741 B2 | 5/2013 | Breiner et al. | |
| 9,261,084 B2 * | 2/2016 | Petersen | B62D 5/093 |
| 9,380,737 B2 | 7/2016 | Bebernes et al. | |
| 2015/0021116 A1 * | 1/2015 | Young | B62D 5/093 |
| | | | 180/406 |

* cited by examiner

ELECTRO-HYDRAULIC STEERING CONTROL SYSTEM

FIELD OF THE DISCLOSURE

The present invention generally relates to a steering control system for a vehicle, and more particularly to a steering control system for a work vehicle configured to reduce the likelihood of a system failure resulting in an undesirable steering action.

BACKGROUND

Agricultural equipment, such as a tractor or a self-propelled combine-harvester, includes an electro-hydraulic steering control system to adjust the position of one or more of a vehicle's wheels to adjust a moving direction of the vehicle. Steering control systems include electro-hydraulic valves which respond to a steering control signal generated by a steering device, such as a steering wheel or joystick, or a steering control signal provided by a global positioning system (GPS) signal. Steering control systems often include one or more sensors configured to sense a position of the steering device or a position of the wheels with respect to a frame of the vehicle. In these types of systems, a failure of an electro-hydraulic valve or an incorrect steering signal to an electro-hydraulic valve by the controller software can initiate an unwanted or undesirable steering action. Such a steering action is identified by one or more of the system sensors and interpreted by a system controller. Once the undesirable steering action is identified by the system controller, a corrective signal is generated by the system controller to prevent unintended steering resulting from the failure. The identification and response to the failure takes a certain amount of time, which is often too long to prevent an undesirable result. What is needed therefore is a steering control system, which is configured such that steering action cannot be initiated by an electro-hydraulic valve or electronic command only, but must also require steering initiation action by the vehicle's driver.

SUMMARY

An electronically controlled electro-hydraulic steering system is disclosed to overcome electro-hydraulic or electrical failures of a steering control system that initiate an undesired steering action.

In one embodiment of the disclosure, there is provided a steering system for a work vehicle having a steerable wheel. The steering system includes a steering input device, configured to provide a steering input to move the steerable wheel, and a pilot system operatively connected to the steering input device. The pilot system includes a pilot line operatively connected to the steering input device. A piloted system includes a direction control valve, operatively connected to the pilot line, and has a piloted control valve output. A steering cylinder is operatively connected to the steerable wheel and to the piloted control valve output, wherein the steering cylinder is configured to move the steerable wheel in response to the piloted control valve output.

In another embodiment, there is provided a steering system for a work vehicle having a steerable wheel. The steering system includes a steering input device configured to provide a first steering input configured to move the steerable wheel in a first direction and a second steering input configured to move the steerable wheel in a second direction. A pilot system is operatively connected to the steering input device. The pilot system includes a first pilot line operatively connected to the first steering input, a second pilot line operatively connected to the second steering input, a first metering pilot valve operatively connected between the first pilot line and the second pilot line, and a second metering pilot valve operatively connected between the first pilot line and the second pilot line. A piloted system is operatively connected to the pilot system. The piloted system includes a first pressure control valve operatively connected to the first pilot line and having a first pressure control valve output, a second pressure control valve operatively connected to the second pilot line and having a second pressure control valve output, and a direction control valve operatively connected to the first pressure control valve output and to the second pressure control valve output. The direction control valve includes a first direction control valve output and a second direction control valve output. A steering cylinder is operatively connected to the steerable wheel and to the first direction control valve output and to the second direction control valve output, wherein the first direction control valve output moves the steerable wheel in a first direction and the second direction control valve output moves the steerable wheel in a second direction.

In still another embodiment, there is provided a work vehicle including steerable wheel, a steering input device configured to provide a steering input to move the steerable wheel, and a steering system, operatively connected to the steerable wheel and the steering input device. The steering system includes a pilot system operatively connected to the steering input device. The pilot system includes a pilot line operatively connected to the steering input device. A piloted system includes a direction control valve, operatively connected to the pilot line, and has a piloted control valve output. A steering cylinder is operatively connected to the steerable wheel and to the piloted control valve output, wherein the steering cylinder is configured to move the steerable wheel in response to the piloted control valve output.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

Figure 1:
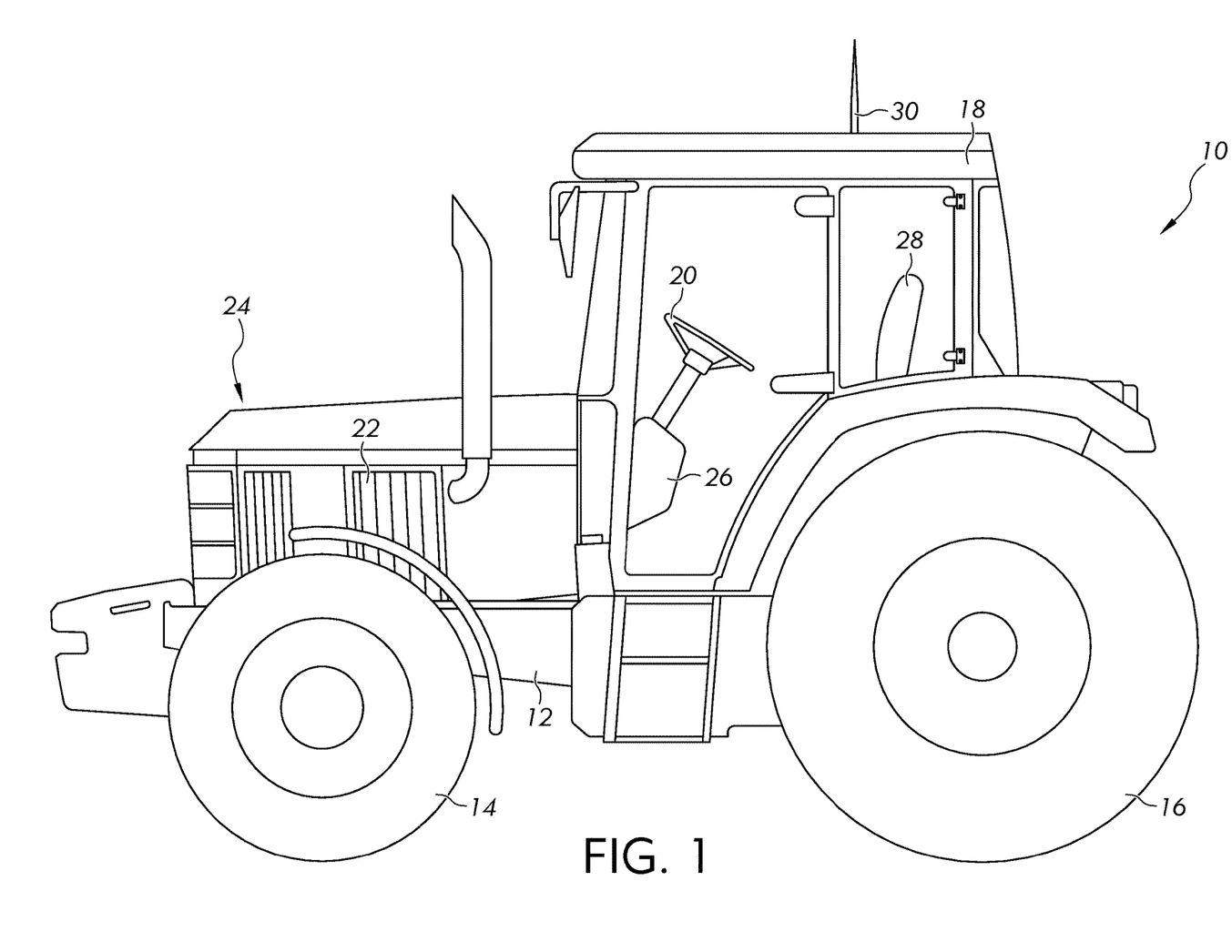
FIG. 1 is a side elevational view of a work vehicle, and more specifically, of an agricultural vehicle such as a tractor.

FIG. 1 is a side elevational view of an agricultural vehicle, and more particularly a tractor 10, including a frame 12 supported on a pair of front wheels 14 and a set of rear wheels 16. An operator cab 18 is mounted on the frame 12 and contains various controls for the vehicle 10 so as to be within the reach of a seated or standing operator. In one aspect, these controls may include a steering wheel 20. An engine 22 is mounted on the frame 12 beneath a housing 24 and supplies power for driven components of the tractor 10. The engine 22, for example, is configured to drive a transmission (not shown), which is coupled to drive the front wheels 14 at various selected speeds and either in forward or reverse modes. In other embodiments, the rear set of wheels is driven to move the tractor, or all of the wheels are driven in an all-wheel drive mode to move the tractor 10.

While the described embodiments are discussed with reference to a tractor, in addition to addition to agricultural vehicles, other work vehicles are contemplated including construction vehicles, forestry vehicles, lawn maintenance vehicles, as well as on-road vehicles such as those used to plow snow, spread salt, or vehicles with towing capability.

The cab 18 defines an operator workstation 26, which is supported by the frame 12. The cabin 18 also encloses a seat 28 for seating the operator. The operator workstation 26, in different embodiments, includes one or more of an operator user interface, steering wheel, a joystick, an accelerator pedal, and a power take-off (PTO) control device for turning on or off the PTO. Pedals for a brake and a clutch are also located in the cabin 18, but are not shown.

The user interface includes a plurality of operator selectable buttons configured to enable the operator to control the operation and function of the tractor 10. The user interface, in one embodiment, includes a user interface screen having a plurality of user selectable buttons to select from a plurality of commands or menus, each of which are selectable through a touch screen having a display. In another embodiment, the user interface includes a plurality of mechanical push buttons as well as a touch screen. In another embodiment, the user interface includes a display screen and only mechanical push buttons. A communication antenna 30 is supported by the cabin 18 and provides for the transmission and reception of signals transmitted through the air. In one embodiment, the communication antenna 30 is a GPS antenna configured to receive and to send global positioning data to and from a GPS satellite as is known by those skilled in the art.

Figure 2:
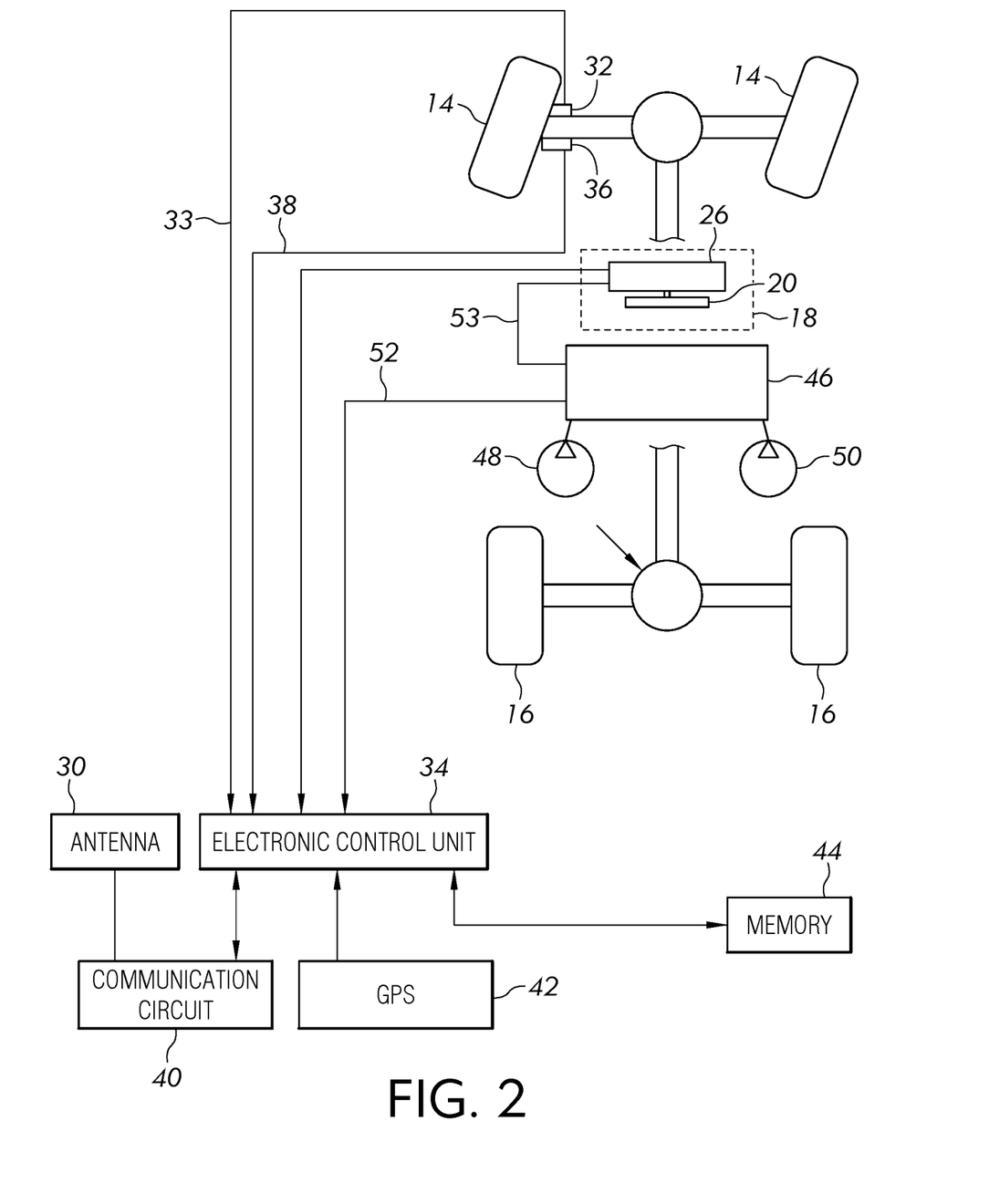
FIG. 2 is a simplified schematic diagram of an electro-hydraulic control system for a work vehicle having steerable wheels.

FIG. 2 is a simplified schematic diagram of the vehicle 10 and a steering control system embodying the invention. In the illustrated embodiment, the front wheels 14 are steerable by the steering wheel 20 which is located in the cab 18. A wheel angle position sensor 32 senses the angular position of the wheels 14 with respect to the frame 12 and includes an output line 33 coupled to an electronic control unit 34, or controller. A steering wheel angle sensor and steering input device 26 operatively connected to the steering wheel and connected via signal lines to the controller 34 and hydraulic valve assembly 46. A wheel speed sensor 36 includes an output line 38, which is coupled to the controller 34, and which provides a wheel speed signal. In other embodiments, wheel speed is alternatively provided by a sensor connected to the rear wheels. Vehicle speed could also be alternatively provided by processing GPS signals. In one embodiment, the wheel speed sensor 36 is used to provide a speed of the vehicle 10. The antenna 30 is operatively connected to a communication circuit 40, which is operatively coupled to the controller 34. A GPS unit 42 provides a vehicle position signal to the controller 34.

The communication circuit 40 is configured to transmit signals generated by the controller 34, which in some applications have been generated in response to information submitted by an operator through the user interface located at the operator workstation 26. A memory 44 is operatively coupled to the controller 34 and is configured to store information. In different embodiments, the memory 44 is an internal memory located within the controller 34 or is in externally located memory.

The controller 34 is configured to execute software instruction stored in the memory 44. The software includes one or more specific applications, components, programs, objects, modules or sequence of instructions typically referred to as "program code". The program code includes one or more instructions located in memory and other storage devices which execute control algorithms to adjust the position of the wheels 14 in response to, for instance, the sensed position of the wheels provided by the sensor 32, commands by the operator via the steering wheel or GPS signals.

In some embodiments, the communication circuit 40 is used for internal communication among devices or circuits located in the vehicle. In still other embodiments, the communication circuit 40 provides for unidirectional or bidirectional communication to and from the antenna 30 as well as to and from the GPS unit 42.

The controller 34, in different embodiments, includes a computer, computer system, or programmable device, e.g., multi-user or single-user computers. In other embodiments, the controller 34 includes one or more processors (e.g. microprocessors), and the associated internal memory including random access memory (RAM) devices comprising the memory storage of the controller 34, as well as any supplemental levels of memory, e.g., cache memories, non-volatile or backup memories (e.g. programmable or flash memories), read-only memories, etc. In addition, the memory can include a memory storage physically located elsewhere from the processing devices and can include any cache memory in a processing device, as well as any storage capacity used as a virtual memory, e.g., as stored on a mass storage device or another computer coupled to controller 34 through the communication circuit 40. The mass storage device can include a cache or other dataspace which can include databases.

The steering control system further includes a valve assembly 46 including one or more hydraulic circuits, including various hydraulic valves, for instance electrically controlled valves, and various hydraulic and electrical lines. The valve assembly 46 receives a charge pressure and an operating pressure from various pumps including a pump 48 and a pump 50. In certain embodiments, the pump 48 is configured as a lower pressure charge pump and the pump 50 is configured as a higher pressure steering pump.

Control signals, for instance, hydraulic and electrical signals, are received by the valve assembly 46 from one or more controllers, here identified as the controller 34, over a signal line 52. Control signals are also received by the valve assembly 46 from the combined steering wheel angle sensor/metering pump 26 through a signal line 53. The signal line 52, while illustrated as a single line, in different embodiments, includes one or more signal lines to transmit electrical signals to and from the hydraulic and electrical valves of the valve assembly 46.

Figure 3:
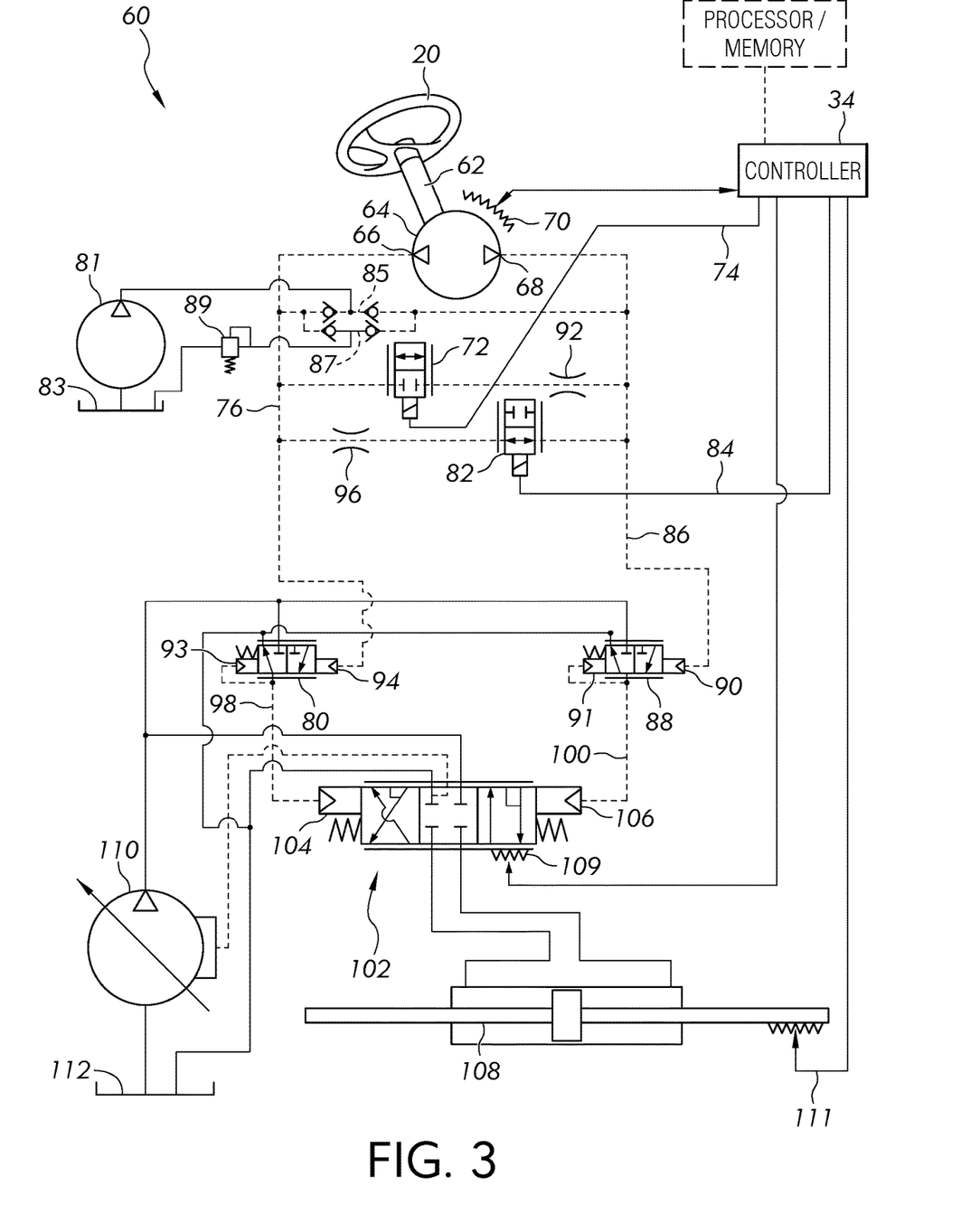
FIG. 3 is one embodiment of an electro-hydraulic steering control system.

FIG. 3 illustrates one embodiment of an electro-hydraulic steering control system 60 including the steering wheel 20 which is coupled to a drive shaft 62 operatively connected to an input metering device 64, such as a gear, vane, piston or any other type of positive displacement pump. The metering device 64 includes a first port 66 and a second port 68, each of which directs pressurized fluid flow in response to movement of the drive shaft 62 about a longitudinal rotational axis. A steering command angle sensor 70 is operatively connected to one of the steering wheel 20, the drive shaft 62, and the metering device 64, and is configured to provide a steering command angle signal to indicate a position of the steering wheel 20 and ultimately to provide an indication of a desired angle of one or all of the steered wheels. The steering command angle sensor 70 is operatively connected to the controller 34 to provide the steering angle command signal.

Port 66 is operatively connected to metering pilot flow bypass restrictor valves 72 and 82 which are controlled by the controller 34 through control lines 74 and 84. Port 66 also delivers pressurized fluid flow to pressurize a pilot line 76, which is operatively connected to a first pilot operated pressure control valve 80. In the same fashion, port 68 is operatively connected to metering pilot flow bypass restrictor valves 72 and 82 which are controlled by the controller 34 through control lines 74 and 84. Port 68 also delivers pressurized fluid flow to pressurize a pilot line 86 which is operatively connected to a second pilot operated pressure control valve 88.

Valves 72 and 82, in different embodiments, are either normally open or normally closed when the system is not operational. In one specific embodiment, one of the valves 72 and 82 is a normally open valve and the other is normally closed valve so that in the event of a general electrical or hydraulic failure, steering response is neither least responsive nor most aggressive. In the illustrated embodiment, valve 72 is normally closed and valve 82 is normally open. Each of the valves 72 and 82 are continuously variable valves in which the amount of flow through the valve is adjusted by the controller 34 through control lines 74 and 84.

Pilot line 76 and pilot line 86 are operatively connected to a low pressure source 81 including a sump 83. A valve 85 is coupled between lines 76 and 86 to assure that the pilot system remains full of fluid. The external pressure source could be a separate pump, flow from another unrelated system on the vehicle, or from a pressure reducing valve connected to a main source of steering flow, such as a pump 110.

The metering device 64 directs fluid flow and consequently adjusts the pressure of the fluid in both the pilot line 76 and pilot line 86. The amount of pressure of the fluid in one of the fluid lines is a direct result of steering direction determined by the metering device 64.

A check valve 87 and a relief valve 89 assure that pressure in the pilot system does not exceed predetermined allowable limits. The relief valve 89 is operatively connected to the sump 83. When the input metering device 64 is embodied as a positive displacement pump, a rotation of the steering wheel in a first direction, for instance a clockwise direction as illustrated, enables the port 68 to provide a positive flow of fluid into the pilot line 86. At the same time, a negative flow of fluid into the port 66 occurs. Counterclockwise rotation of the steering wheel, as illustrated, provides a positive flow of fluid into the pilot line 76 and a negative flow of fluid into the port 68.

The fluid pressure in each of the pilot lines 76 and 86 is adjusted by each of the valves 72 and 82 in response to control signals generated by the controller 34 and transmitted through control lines 74 and 84. By controlling the amount of pressure in each of the pilot lines 76 and 86, the pressure signal to each of the first pilot operated pressure control valve 80 and the second pilot operated pressure control valve 88 is provided.

Since the valve 72 and valve 82 have an orifice size controlled by the controller 34 and provide the appropriate amount of pressure in pilot lines 76 and 86, these valves are considered to be part of a pilot system. The pilot system also includes the fixed orifices or restrictors 92 and 96, external low pressure source 81, metering pump 64 and the other described valves which establish fluid pressure in pilot lines 76 and 86. In other embodiments, the pilot system includes fewer number of or a larger number of devices. The pilot system output lines, pilot lines 76 and 86 are connected to valves 80 and 88 which control a flow and directional control valve which ultimately controls the direction of the wheels. Valves 80 and 88 are considered to be a piloted system.

The flow produced by the metering pump 64 at port 68 along pilot line 86 moves not only to a pilot area 90 of valve 88, but some flow attempts to move to the port 66 of the metering pump 64, through a restrictors 92 and 96 and valves 72 and 82 instead of pressurizing the pilot area 90 of valve 88. This bypass flow creates pressure on pilot area 90 of pressure control valve 88. Valve 88 then provides an output pressure generally proportional to the pressure applied to its pilot area 90. Valve 88 includes an output pilot area 91.

Likewise, the flow produced by the metering pump 64 at port 66 along pilot line 76, moves not only to a pilot area 94 of valve 80, but some flow attempts to move to the port 68 of the metering pump 64, through a restrictors 96 and 92 and valves 82 and 72, instead of pressurizing the pilot area 94 of valve 88. This bypass flow creates pressure on pilot area 94 of pressure control valve 80. Valve 80 then provides an output pressure generally proportional to the pressure applied to the pilot area 94. Valve 80 includes an output pilot area 93.

Each of the valves 80 and 88 generates an output pressure at pressure outputs 98 and 100 respectively. Pressure output 98 is operatively connected to a pilot operated flow and direction control valve 102 at a first pilot area 104. In one embodiment, the control valve 102 is a three position, pilot pressure controlled spool valve. The pressure output 100 is operatively connected to the control valve 102 at a second pilot area 106. Fluid pressure provided at either one of the first or second pilot areas 104 and 106 causes the spool of the valve 102 to move from a center position to cause oil to flow to a steering cylinder 108 which moves the wheels 14 in a direction dictated by the steering device 20. A valve sensor 109 is configured to determine the position of the spool of the valve 102 and to provide the determined position as a signal to the controller 34. The position of the steering cylinder 108 is identified by a cylinder position sensor 111. The identified position of the cylinder 108 is provided to the controller 34. Alternatively, a steered wheel angle position sensor could be used instead of the steering cylinder position sensor. Both the sensor 111 and the steered wheel angle position sensor 32 are considered as steering output feedback sensors.

By specifying a difference in the input pilot area 90 and an output pilot area 91 of valve 88, and likewise for output pilot area 93 of valve 102, a pilot pressure is provided to valve 102 which is higher than the output pressure provided by the metering pump 64. In this way steering hand wheel torques can be reduced.

In the illustrated embodiment, valves 80 and 88 are pilot operated pressure reducing/relieving valves. In another embodiment by connecting a flow source directly to the pilot areas of valve 102, valves 80 and 88 are configured as pilot operated pressure relief valves. A hydraulic pump 110 is operatively connected to the valve 102, which when activated by one of the first and second pilot areas 104 and 106, supplies fluid under pressure to move the steering cylinder 108. The hydraulic pump 110 is also operatively connected to pressure control valves 80 and 88. A sump 112 includes a source of fluid for use by the pump 110. Each of the valves 80, 88, and 102 includes fluid outputs which deliver excess fluid to the sump 112 when not required to adjust the position the steering cylinder 108. The pump 110 is generally considered to be a high pressure source of fluid.

The output pressure from valve 88 is applied to the pilot area 106 of valve 102 causing it to move from its center position which in turn causes oil to flow to cylinder 108 and hence turn the steerable wheels. It is usually desired to have a position responsive steering system whereby the position of cylinder 108 (and the steered wheels) is generally proportional to the rotational position of the steering wheel from a center point. In one embodiment, the position responsive steering is accomplished by controlling or preventing bypass of the pilot flow through orifices 92 and 96 through control of valves 82 and 72. Valves 82 and 72 are controlled by the controller 34.

In one embodiment, the controller 34 monitors signals from sensors 70, 109, and 111 when all are utilized. In one possible control algorithm, input sensor 70, valve sensor 109, and cylinder position sensor 111 are monitored and valves 82 and 72 are controlled such that valve 102 produces flow to cylinder 108 to provide position responsive steering. In this control scheme, there is an inner control loop using sensor 109 and sensor 70 and an outer control loop between sensor 111 and sensor 70. The inner control loop is used by the controller 34 to monitor the rate of turning of the steering device 20 via sensor 70 and to monitor the position of valve 102 via sensor 109, and in response to these sensor outputs, control valves 72 and 82 are adjusted such that given the output/input characteristics of valve 102, a flow is produced that approximately provides position responsive steering. The outer control loop is used by the controller to monitor the position of steering device 20 via sensor 70 and the steered wheel position or angle via sensor 111 to make additional adjustments to the control of valves 72 and 82 to improve the accuracy of the position responsive steering.

In one embodiment, when steering cylinder 108 reaches an end of travel or is prevented from moving further due to overload, valves 82 and 72 are closed to give tactile feedback to the operator that steering has either reached its limit or stalled.

In another embodiment, the control algorithm is designed to include variable steering ratio, either as a function of vehicle speed, turn angle or some other parameter. For example, under medium speed driving conditions of approximately 16 kilometers per hour (kph) as determined by signals from a wheel speed or GPS sensor the control algorithm might be written so that three (3) complete turns of the steering wheel 20 results in turning the steerable wheels from full left to full right. Whereas, at lower and higher speeds the control algorithm could be written so that the internally coded parameters result in a full left to right turn with only one and one half (1.5) turns or five (5) turns respectively of the steering wheel 20. In like manner it would be possible to change the control parameters as a function of steered wheel angle to effect steering ratio rather than vehicle speed. In like manner it would be possible to change the control parameters from some external input provided by the attached or towed implement or from a setting input by the driver to result in more or less responsive steering. The means to accomplish this are well known by those schooled in the art of control software development.

In still other embodiments, the steering system includes one or more fluid temperature sensors to identify fluid temperature(s) which may be utilized to improve performance.

Figure 4:
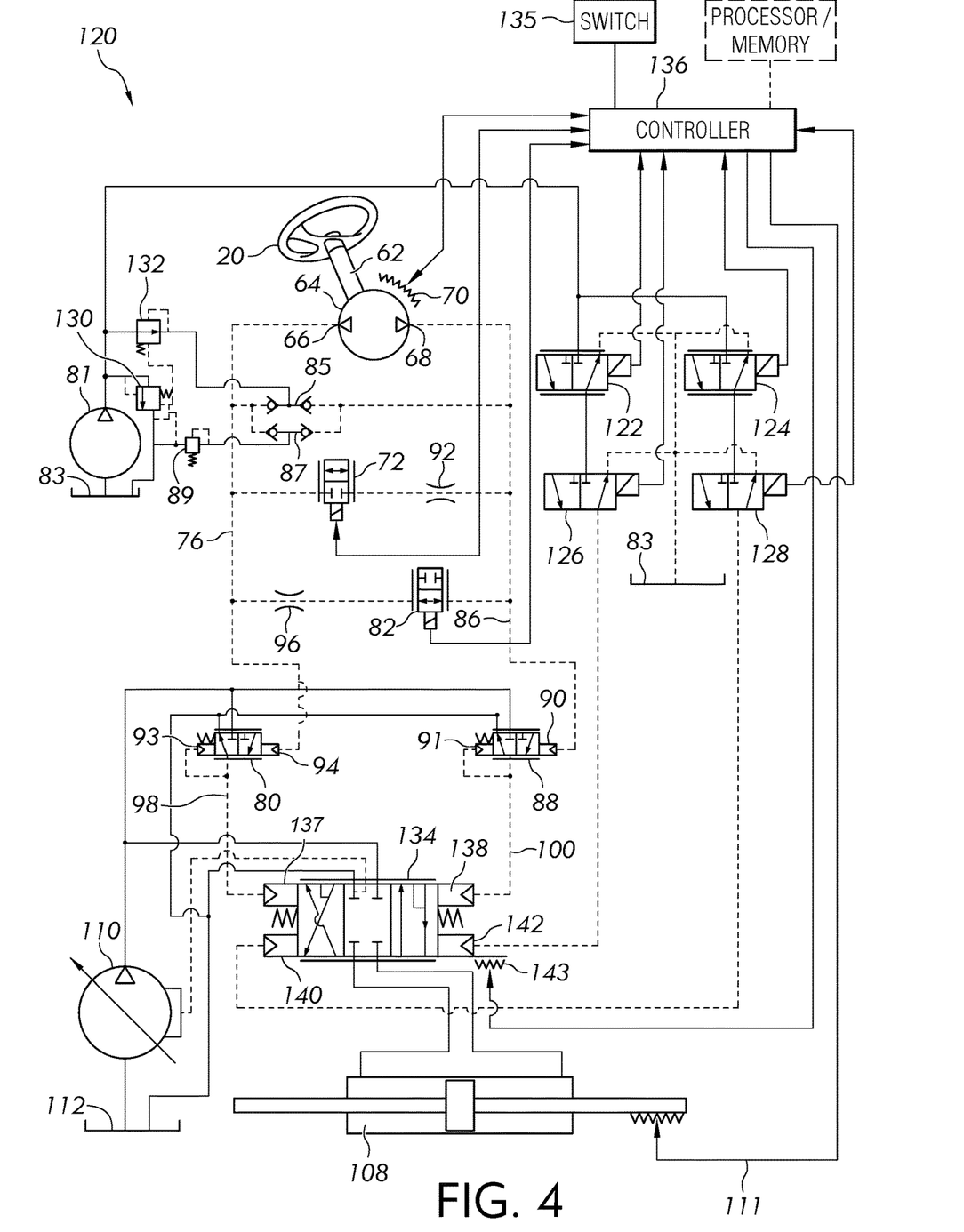
FIG. 4 is another embodiment of an electro-hydraulic steering control system.

FIG. 4 illustrates another embodiment of an electro-hydraulic steering control system 120 having an external steering control using an electronic guidance system, such as one using GPS or row following signals. In this embodiment, the steering control system of FIG. 3 is configured to include additional pilot valves to provide an integrated cost effective external control. The devices which are common to both of the embodiments of FIGS. 3 and 4 are identified with the same element numbers and different or additional devices are newly identified.

As illustrated in FIG. 4, the steering system 120 includes the capability of external steering control such as guidance systems based on GPS (Global Positioning System) signals. In this embodiment, the steering system is be configured to include additional pilot valves to provide an integrated cost effective external control.

One means of providing integrated external control capability shown in FIG. 4 includes the addition of external control valves 122, 124, 126, and 128. A relief valve 130 and pressure reducing valve 132 are provided to enable pump 81 to keep the main steering system pilot circuit full of fluid and to also provide a pressure and flow source for the external control. Alternatively, the pressure and flow source for external control may be provided by supplying the pressure and flow through a pressure reducing valve connected to the high pressure pump 110. The GPS unit 42 is operatively connected to the controller 34 as illustrated in FIG. 2.

Each of the external electronic control valves 122, 124, 126 and 128 includes control lines operatively connected to a controller 136, which in this embodiment is configured with a different or additional set of control instructions than the controller 34 of FIG. 3. The control valves 126 and 128, in this embodiment, provide redundancy against unintended external control in the event of failure of valves 122 and 124. In other embodiments, valves 126 and 128 are not included. In the illustrated embodiment, valves 122 and 124 are represented as direction/flow control type valves. In other embodiments, the valves 122 and 124 are pressure reducing/relieving valves.

A switch 135 is operatively connected to the controller 136. Operation of the switch in concert with the controller 34 results in a first state indicating that the vehicle is to be operated in a manual mode and a second state indicating that the vehicle is to be operated in an external control mode, i.e. the GPS mode. In one embodiment, the switch 135 is located at the operator workstation 26 for use by the operator. The operator moves the switch from one state to the other state to signal to the controller 136 that the vehicle is in one of the manual control mode or the external control mode. In addition, movement of the steering wheel as indicated by the sensor 70 will cause the controller 136 to change control mode from external to manual mode.

Since the steering control system 120 includes the use of the external control to adjust the cylinder 108, a pilot operated flow and direction control valve 134 includes a first pilot area 137 operatively connected to the pilot line 98 and a second pilot area 138 operatively connected to the pilot line 100. The pilot areas 137 and 138 provide the same function as pilot areas 104 and 106 of FIG. 3. The valve 134 includes two additional pilot areas, pilot areas 140 and 142, in this embodiment. Pilot area 142 is operatively connected to valve 126 and pilot are 142 is operatively connected to valve 128. A valve position sensor 143 identifies the position of the valve 134.

In another embodiment, the valve 134 does not include the pilot areas 140 and 142. Instead the valves 80 and 88 each include an additional pilot area (not illustrated) which connects to one of the outputs of the valves 126 and 128. In this case, valves 122 and 124 are configured as pressure reducing relieving valves.

For a normal steering using an input at the steering device 20, each of the valves 122, 124, 126, and 128 are in a non-energized position which drains any control pilot pressure provided by the pump 81 to the drain 83. Steering is accomplished as described with respect to FIG. 3.

During an external control mode of the embodiment of FIG. 4 which includes the extra pilot areas 140 and 142 of valve 134, valves 122, 126, 124 and 128 are controlled by the controller 136. In the alternative configuration with the extra pilot areas on valves 80 and 88, one or both of valves 72 and 86 are held in the open position.

To execute an externally controlled turn in one direction, valve 126 is energized to connect the output of valve 122 to one external control pilot area 142 of valve 134, or to valve 88 if that configuration is used. Valve 122 is then energized, sending oil to move valve 134 directly, or via an increase in output pressure from valve 88, such that flow is directed to cylinder 108. Electronic control of valve 122 is accomplished through closing a control loop around desired turn angle and sensor 111 and possibly valve position sensor 143 in a similar manner as described for the embodiment of FIG. 3. A turning of the wheels in the opposite direction is accomplished similarly by energizing valves 128 and 124.

In additional embodiments, an additional external steering valve, such as steering valve 134, is provided to operatively connect in parallel with the illustrated vehicle steering system.

While exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. A steering system for a work vehicle having to steerable wheel, the steering system comprising:
a steering input device configured to provide a steering input to move the steerable wheel;
a pilot system operatively connected to the steering input device, the pilot system including a first metering valve, a second metering valve, and a pilot line operatively connected to the first metering valve, to the second metering valve, and to the steering input device;
a piloted system including a direction control valve, operatively connected to the pilot line, and having a piloted control valve output;
a steering cylinder operatively connected to the steerable wheel and to the piloted control valve output, wherein the steering cylinder is configured to move the steerable wheel in response to the piloted control valve output, and
a steering command angle sensor operatively connected to the steering input device, a valve position sensor operatively connected to the direction control valve, and one of a cylinder position sensor operatively connected to the steering cylinder and a steered wheel angle sensor, wherein each of the steering command angle sensor, the valve position sensor, the cylinder position sensor, and the steered wheel angle sensor provides a signal configured to adjust a position of the first metering pilot valve and a position of the second metering pilot valve.

2. The steering system of claim 1 wherein the pilot line includes a first pilot line and a second pilot line, each operatively connected to the steering input, wherein the first pilot line is operatively connected to a first pilot area of the direction control valve and the second pilot line is operatively connected to a second pilot area of the direction control valve.

3. The steering system of claim 2 wherein the first metering valve is operatively connected to the first pilot line and the second metering valve is operatively connected to the second pilot line, wherein the first metering valve is normally open or normally closed and the second metering valve is normally open or normally closed.

4. The steering system of claim 3 wherein the first metering valve and the second metering valve are configured to adjust a first fluid pressure in the first pilot line in response to the steering input and the first metering valve and the second metering valve are configured to adjust a second fluid pressure in the second pilot line in response to the steering input.

5. The steering system of claim 4 wherein the piloted system includes a first pressure control valve operatively connected to the first pilot line and to a first pilot area of the direction control valve and a second pressure control valve operatively connected to the second pilot line and to a second pilot area of the direction control valve.

6. The steering system of claim 5 comprising a high pressure source of high pressure fluid, wherein the first pressure control valve, the second pressure control valve, and the direction control valve are operatively connected to the high pressure source.

7. The steering system of claim 3 further comprising a first flow control valve having a first control line and a second flow control valve having a second control line and the direction control valve further includes a third pilot area operatively connected to the first control line and fourth pilot area operatively connected to the second control line.

8. The steering system of claim 7 further comprising a controller operatively connected to the first metering pilot valve, the second metering pilot valve, the first flow control valve and the second flow control valve, wherein the controller includes a processor and a memory wherein the memory is configured to store program instructions and the processor is configured to execute the stored program instructions to:
identify one of a manual control mode and an external control mode; and
activate both of the first metering pilot valve and the second metering pilot valve or both of the first flow control valve and the second flow control valve in response to the identified control mode.

9. The steering system of claim 8 further comprising a steering command angle sensor operatively connected to the steering input device, a valve position sensor operatively connected to the direction control valve, and a cylinder position sensor operatively connected to the steering cylinder, wherein each of the steering command angle sensor, the valve position sensor, and the cylinder position sensor provide a signal to the controller to adjust a position of the first flow control valve and a position of the second flow control valve.

10. A work vehicle comprising:
a steerable wheel;
a steering input device configured to provide a steering input to move the steerable wheel;
a steering system, operatively connected to the steerable wheel and the steering input device, wherein the steering system includes a pilot system operatively connected to the steering input device, the pilot system including a first pilot line and a second pilot line each operatively connected to the steering input device and a first metering pilot valve operatively connected to the first pilot line and a second metering pilot valve operatively connected to the second pilot line, a piloted system including a direction control valve, operatively connected to the pilot line, and having a piloted control valve output, and a steering cylinder operatively connected to the steerable wheel and to the piloted control valve output, wherein the steering cylinder is configured to move the steerable wheel in response to the piloted control valve output, and
a steering command angle sensor operatively connected to the steering input device, a valve position sensor operatively connected to the direction control valve, and one of a cylinder position sensor operatively connected to the steering cylinder and a steered wheel angle sensor, wherein each of the steering command angle sensor, the valve position sensor, the cylinder position sensor, and the steered wheel angle sensor provides a signal configured to adjust a position of the first metering pilot valve and a position of the second metering pilot valve.

11. The work vehicle of claim 10 wherein the first pilot line is operatively connected to a first pilot area of the direction control valve and the second pilot line is operatively connected to a second pilot area of the direction control valve.

12. The work vehicle of claim 11 wherein one of the first metering pilot valve and the second metering pilot valve is normally open and the other of the first metering pilot valve and the second metering pilot valve is normally closed.

13. The work vehicle of claim 12 wherein the first metering pilot valve and the second metering pilot valve are configured to adjust a fluid pressure in the first pilot line in response to the steering input and the first metering pilot valve and the second metering pilot valve are configured to adjust a fluid pressure in the second pilot line in response to the steering input.

14. The work vehicle of claim 13 wherein the piloted system includes a first pressure control valve operatively connected to the first pilot line and to a first pilot area of the direction control valve and a second pressure control valve operatively connected to the second pilot line and to a second pilot area of the direction control valve.

15. A steering system for a work vehicle having a steerable wheel, the steering system comprising:
a steering input device configured to provide a first steering input configured to move the steerable wheel in a first direction and a second steering input configured to move the steerable wheel in a second direction;
a pilot system operatively connected to the steering input device, the pilot system including a first metering pilot valve, a second metering pilot valve, a first pilot line operatively connected to the first steering input, and a second pilot line operatively connected to the second steering input, the first and second metering pilot valves operatively connected between the first pilot line and the second pilot line;
a piloted system operatively connected to the pilot system, the piloted system including, a first pressure control valve operatively connected to the first pilot line and having a first pressure control valve output, a second pressure control valve operatively connected to the second pilot line and having a second pressure control valve output, and a direction control valve operatively connected to the first pilot line via the first pressure control valve output and to the second pilot line via the second pressure control valve output, the direction control valve having a first direction control valve output and a second direction control valve output; and
a steering cylinder operatively connected to the steerable wheel, the first direction control valve output, and the second direction control valve output, wherein the steering cylinder is configured to move the steerable wheel in response to the first or second direction control valve output, and
a steering command angle sensor operatively connected to the steering input device, a valve position sensor operatively connected to the direction control valve, and one of a cylinder position sensor operatively connected to the steering cylinder and a steered wheel angle sensor, wherein each of the steering command angle sensor, the valve position sensor, the cylinder position sensor, and the steered wheel angle sensor provide a signal to adjust a position of the first metering pilot valve and a position of the second metering pilot valve.

16. The steering system of claim 15 further comprising a controller operatively connected to the first metering pilot valve and to the second metering pilot valve, wherein the controller includes a processor and a memory, wherein the memory is configured to store program instructions and the processor is configured to execute the stored program instructions to:
adjust a position of the first metering pilot valve and the second metering pilot valve to move the direction control valve in a first direction;
adjust a position of the first metering pilot valve and the second metering pilot valve to move the direction control valve in a second direction opposite the first.

17. The steering system of claim 16 further comprising a first flow control valve or a first pressure control valve having a first control output and a second flow control valve or a second pressure control valve having a second control output and the direction control valve further includes a third pilot area operatively connected to the first control output and a fourth pilot area operatively connected to the second control output.

18. The steering system of claim 17 further comprising a controller operatively connected to the first metering pilot valve, the second metering pilot valve, the first flow control valve or the first pressure control valve, and the second flow control valve or the second pressure control valve, wherein the controller includes a processor and a memory, wherein the memory is configured to store program instructions and the processor is configured to execute the stored program instructions to:
  identify one of a manual control mode and an external control mode; and
  activate both of the first metering pilot valve and the second metering pilot valve or both of the first flow control valve or first pressure control valve and the second flow control valve or the second pressure control valve in response to the identified control mode.

19. The steering system of claim 15, wherein, one of the first direction control, valve output and the second direction control valve output moves the steerable wheel in a first direction and the other of the first direction control valve output and the second direction control valve output moves the steerable wheel in a second direction.

\* \* \* \* \*